April 24, 1962   L. PÉRAS   3,030,854
APPARATUS FOR THE DIRECT ANALYSIS OF SPECTRAL LINES
Filed May 28, 1957   4 Sheets-Sheet 1

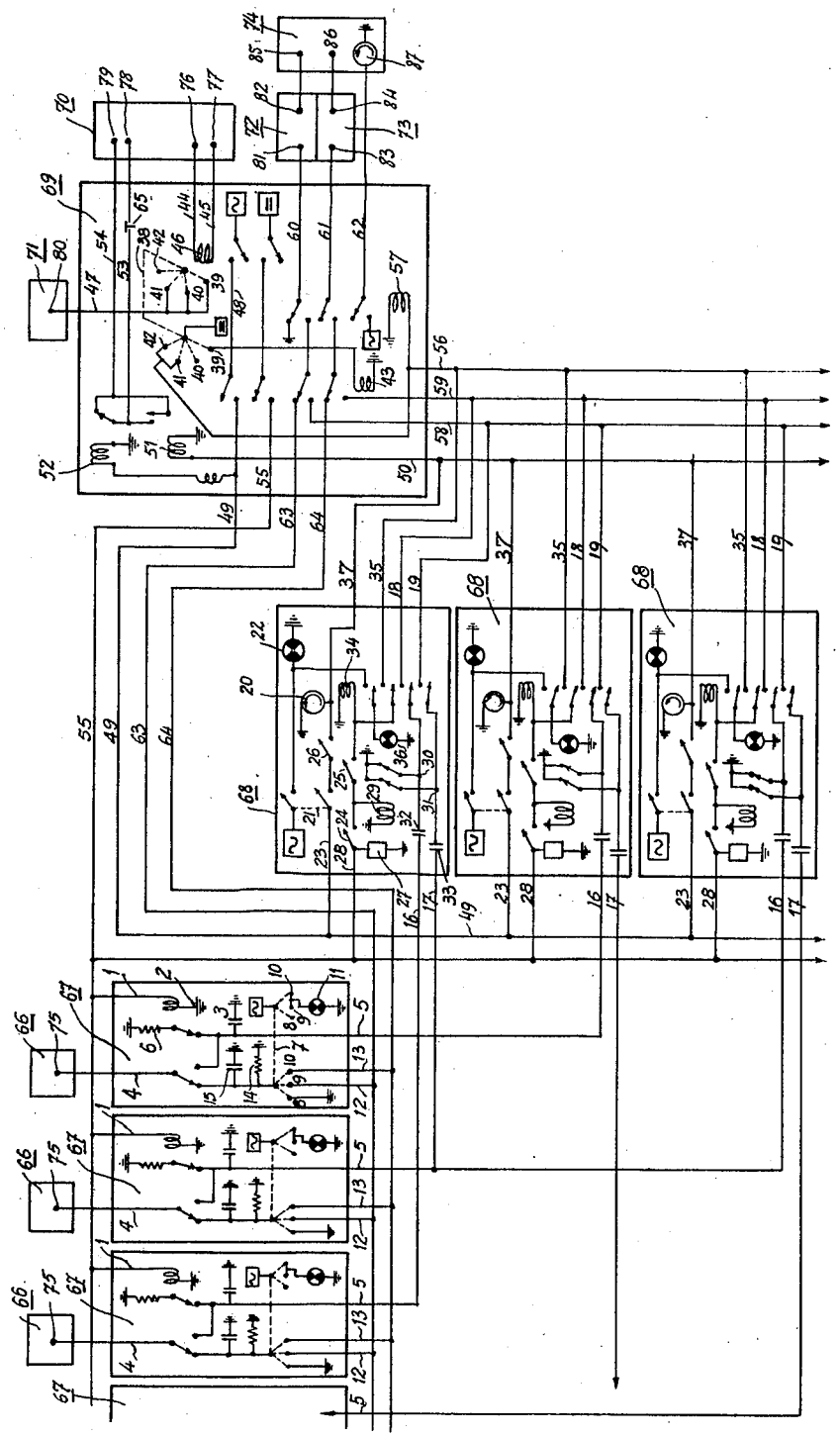

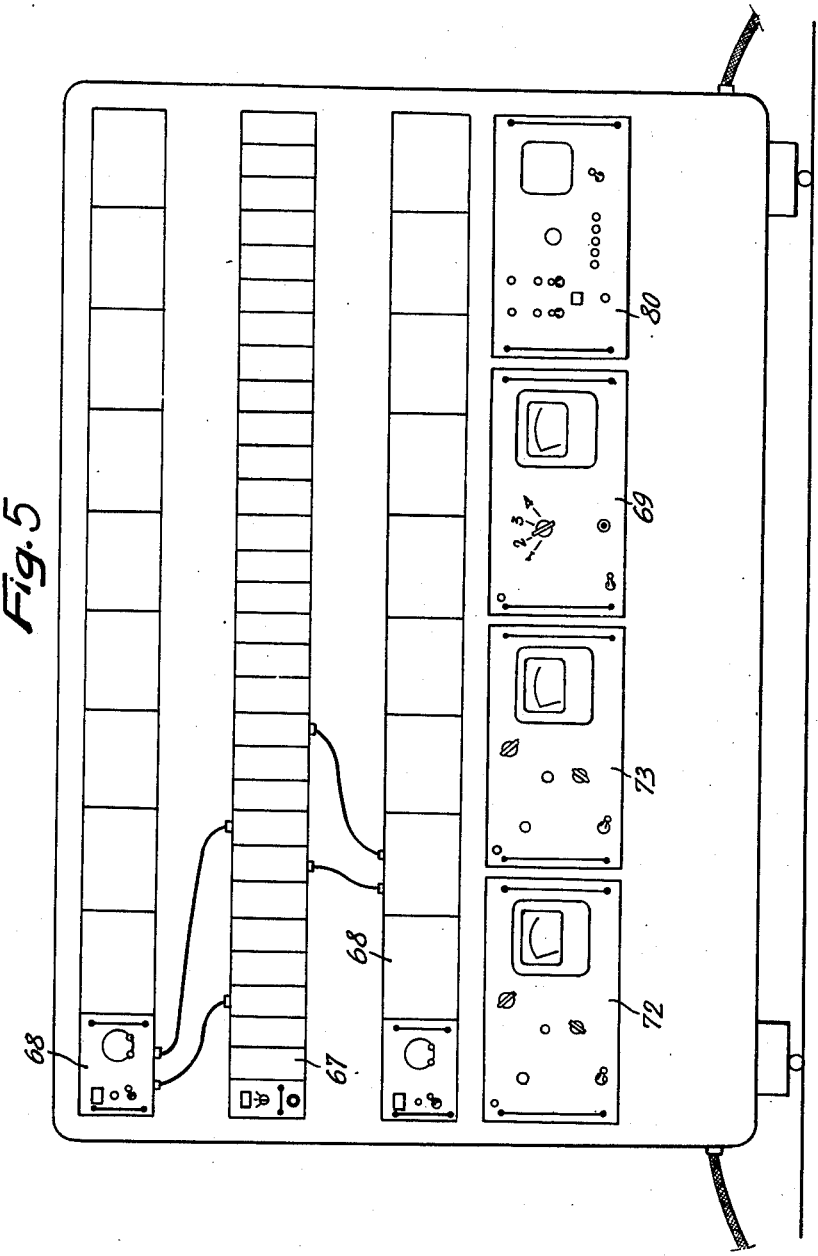

United States Patent Office
3,030,854
Patented Apr. 24, 1962

3,030,854
APPARATUS FOR THE DIRECT ANALYSIS
OF SPECTRAL LINES
Lucien Péras, Billancourt, France, assignor to Regie Nationale des Usines Renault, Billancourt, France, French works under control and authority of the French Government
Filed May 28, 1957, Ser. No. 662,262
Claims priority, application France June 8, 1956
9 Claims. (Cl. 88—14)

This invention relates to the analysis of materials through the spectral technique and has particular reference to improved apparatus for effecting the direct analysis of spectral lines.

The use of spectral techniques for analytical purposes is spreading more and more in industrial laboratories and research laboratories, due to the rapidity, sensitiveness and accuracy of these techniques.

The spectral techniques consist essentially in analyzing the substances by observation of its light spectrum; in other words, there is observed the spectrum of the light emitted by a spark or an arc flashing across two electrodes, one of these electrodes consisting of the substance to be analyzed.

In the present specification, certain expressions and terms of art are employed corresponding to those in current use in the technique concerned. These expressions and their definitions for the purposes of the present invention are as follows:

By the term "evolution" is meant the course or development of the value of a quantity (e.g. intensity of light) with respect to time, irrespective of whether the said quantity is varying or remains constant. An "evolution unit" is a device intended and designed to determine the said development.

By "striking period" is meant the initial building-up period of the spark before the electrical currents and other parameters have reached a sufficiently stable condition for measurement.

The "sparking period" is the period of time for which the sample is subjected to electrical excitation, in the form of sparking or arcing.

The "integration period" is the sparking period less the striking period.

Although conventional spectral techniques utilizing the photographic emulsion as a receiver are faster than chemical analytical processes, they are now considered as too slow for most purposes. The still recent trend towards the so-called "direct-reading" spectral techniques utilizing photo-electric cells as receivers is justified by the fact that they are faster and more accurate. Now these techniques have been developed up to now more particularly in the field of analyses by emission. Thus, they permit the analysis of a metal during its production in iron and steelworks. Besides, they are superior to conventional techniques as far as the investigation of spectral operations is concerned, and they afford an easier development of analytical processes.

Direct spectral analysis apparatus of the emission type which have been known heretofore utilize photo-electric cell receivers and give the measure of the ratio of the intensities of analysis lines to the inensities of reference lines (internal standard method). These apparatus are divided into two classes:

(1) Some apparatus of the so-called "scanning cell" type comprise two photo-electric cells, one cell being positioned on a reference line and the other adapted to be moved by an automatic mechanical device for scanning the spectrum; the movable or scanning cell is stopped successively on the different lines to be analyzed. During the sparking a recorder indicates the measure of the intensities of the lines scanned in succession, these intensities being confronted with those of the reference line.

The hitherto known apparatus of this type give a measurement of the evolution of intensities, in that an intensity ratio is recorded as a function of time.

The advantages characterizing these apparatus are as follows:

(a) They incorporate only two photo-electric cells;
(b) It is possible to observe any desired line in the spectrum;
(c) Any desired line of the spectrum may be subjected to the analysis at a moderate cost;
(d) It is possible to make a close observation of the evolution of the intensities of a pair of lines during the sparking;
(e) The electrical part of the apparatus is relatively simple.

However, as a counterpart, these apparatus are characterized by the following drawbacks:

(a) All the lines to be analyzed must be confronted with the same reference line;
(b) The reference line must be located outside the waveband of the analyzed lines. Thus, the intensity ratios for the lines of analysis furthest away from the reference line very with the time due to variations in the transparency of the optical system employed, as a consequence of dust, damp vapor or other deposits formed on the optical surfaces;
(c) The changing of the reference line is an extremely delicate manual operation;
(d) As the lines are scanned successively by order or wavelength, the striking times increase with the lines taken in this order and are not always favorable as far as the accuracy of the analysis is concerned. Thus, with an apparatus of this type it is possible to study the evolution of the line ratios as a function of time and to infer therefrom the most favorable striking times, but it is scarcely possible to introduce for all practical purposes the conclusions derived from these studies in the analysis programme;
(e) As the lines are scanned separately and in succession the complete analysis may be considered as a long work, although it takes less time than the photographic process;
(f) With these apparatus it is possible to properly observe the evolution of the intensity ratio of a pair of spectral lines during the sparking but not the evolution of the intensity of a line during the sparking.

(2) Other so-called "multiple cell" apparatus comprise a greater number of photo-electric cells positioned the ones on the lines to be analyzed and the other on reference lines. During the sparking, and after a certain striking time, the currents delivered by the photo-electric cells charge capacitors. The sparking is discontinued at a predetermined voltage in the circuit of the reference line, then the voltages in the circuits of the lines thus analyzed are measured. A plurality of programmes of analysis are available, each of them being characterized by the selection of the reference line and by the selection of the lines to be analyzed.

The known apparatus of this type are of the integrating measurement type; in other words, they indicate the intensity integrals during a predetermined time interval.

The advantages characterizing these apparatus are as follows:

(a) The reference lines may be taken in any desired portion of the spectrum;
(b) The changing of the programme of analysis is instantaneous as it is effected by means of a simple switching movement;
(c) As the lines are analysed simultaneously the total time required for carrying out the analysis is relatively short.

However, as a counterpart, these apparatus have the following drawbacks:

(a) In each programme of analysis, the same line is used as a reference line for all the lines of analysis;

(b) As the beginning of the charging time of all the capacitors occurs at the same moment, the striking time is the same for all the lines;

(c) As the end of the charging time of all the capacitors occurs at the same moment, the integrating time is the same for all the lines;

(d) Although these apparatus are particularly suitable for observing the evolution of the intensity of a line during the sparking, they are unsuitable for studying the evolution of the intensity ratio of a pair of lines during the sparking;

(e) The composition of the programmes of analysis is strictly and definitively fixed and cannot be altered at will;

(f) An automatic control device to be associated with this system is compulsorily of complex design.

Now the direct analysis apparatus forming the subject-matter of this invention belongs to the second class; it comprises a number of photo-electric cells, each cell corresponding to one line of the spectrum. Thus, it offers the aforesaid advantages inherent to this class of apparatus but in addition has other advantageous features listed hereinafter:

(a) In a programme of analysis, different reference lines may be associated with the different lines of analysis;

(b) Different "striking" times and different integrating times may be utilized for the various lines;

(c) The measurements are effected during the sparking period and this leads to the shortest possible time of analysis;

(d) The programmes of analysis are set up artificially according to needs. Thus, it is easy to introduce in a programme a new pair of lines (selected amongst the lines provided with photo-electric cells) it is easy to change the programme of analysis, for example in view of analyzing a different substance;

(e) The design of any automatic control device and of the electronic assembly is relatively very simple;

(f) The greater part of the apparatus consists of interchangeable elements so that servicing is extremely simplified;

(g) In addition to its essential function of carrying out current analysis by integration, the apparatus is suitable for effecting without difficulty the study of the evolution of the intensity of any desired line during the sparking, as well as the study of the evolution of the intensity ratio of any desired pair of lines during the sparking, for research purposes or for developing programmes of current analysis;

(h) In addition to its essential function of carrying out current analysis by integration, the apparatus is suitable for effecting without difficulty the measurement of the dark currents of photo-electric cells, as well as the measurement of the photo-currents delivered under an auxiliary illumination and of the ratio of these photo-currents taken by pairs, for the purpose of checking the operation of certain members;

(i) The selection of the desired function of the apparatus is accomplished very easily by simply actuating a switch.

The device forming the subject-matter of this invention, which is called a "spectroreceiver," may be utilized with any desired spectrum generating system.

The spectrum generating system forms no part of this invention and comprises in general:

(1) An emitting source of radiation which is energized through a suitable device;

(2) The substance to be analysed, which is subjected to this primary radiation to produce a secondary radiation;

(3) A suitable system for analysing the secondary radiation and producing a spectrum.

In certain cases, all the elements cited hereinabove are present, such as:

(a) Systems generating a spectrum of fluorescence (for example an X-ray fluorescence);

(b) Micro-analysers of the electron-probe type;

(c) Systems generating an absorption spectrum (for example ultra-violet, visible, infrared radiations).

In other cases some of these elements are not present, for example:

(a) In systems generating a diffraction spectrum (electron or X-radiation). The substance to be studied is subjected to an electron or X-radiation to decompose this radiation into a diffraction spectrum and act in turn as an analysing system as mentioned in paragraph (3) hereinabove.

(b) In systems generating an emission spectrum. The substance to be studied is subjected to sparking or arcing by an electrical generator, produces an electromagnetic radiation and acts in turn like the source mentioned in paragraph (1) hereinabove.

The spectroreceiver according to this invention is adapted to equip any desired spectrum generating system but is particularly advantageous in those cases where the intensity of the spectral lines varies as a function of time. The most important among these cases is that of the spectral analysis by emission, wherein the processes set up by the sparking have a marked evolutionary character, resulting in variations and fluctuations in the intensities of the spectral lines and in their intensity ratios. In view of the foregoing, certain features of the spectroreceiver described in a later part of this disclosure will deal more particularly with the reception of an emission spectrum.

Thus, it will be assumed—as in known types of emission analysis apparatus—that the spectrum generating system comprises a source of radiation which produces during the time intervals other than the sparking times an illumination of the spectrum spot in order to increase the stability of the photo-electric cells. This device will be called hereafter "non-spectral radiation device." This non-spectral radiation may also serve as a reference radiation.

In order to afford a clearer understanding of the present invention and of the manner in which the same may be carried out in practice, reference will now be made to the accompanying drawings forming part of this specification and illustrating diagrammatically a few embodiments of the invention. In the drawings:

FIGURE 4 is a complete wiring diagram of an apparatus constructed in accordance with the teachings of this invention; and FIGURE 5 is a block diagram showing the relative arrangement of the elements on a control panel or switchboard.

Figure 1:
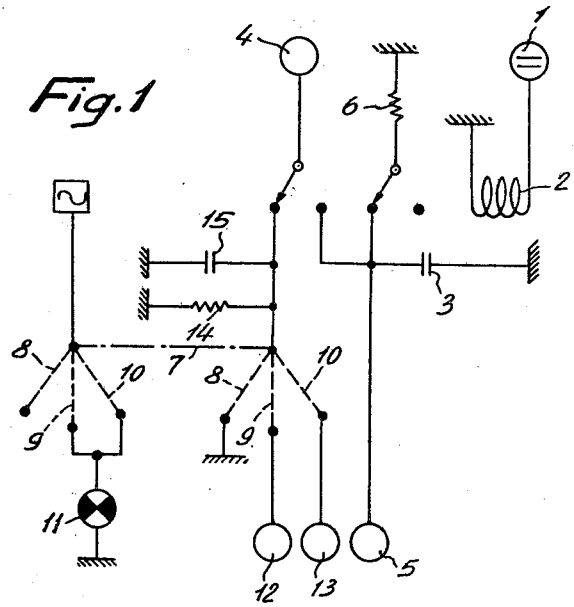
FIGURE 1 is a wiring diagram showing an "evolution" unit.

The spectroreceiver according to this invention comprises esentially:

(a) An assembly of intensity sources 66;
(b) An assembly of evolution units 67;
(c) An assembly of integration units 68;
(d) A control centre 69;
(e) Two electron amplifiers 72 and 73; and
(f) An electron recorder 74.

This spectroreceiver has essentially two separate functions: a so-called "evolution" function for recording as a function of time the ratio of two photo-currents (instaritaneous value) which is utilized for investigation and adjustments purposes; and a so-called "integration" function for measuring the ratio of two photo-currents integrated during a time interval, which are used for proportioning elements.

I. SOURCES OF INTENSITY (66)

Different radiation fluxes are received by the spectro-receiver:

(1) Fluxes from the different lines selected in the spectrum, respectively. In the text following, these fluxes will be called "spectral fluxes";

(2) Possibly, a flux taken before the spectral decomposition of the radiation; in the text following, this flux will be termed "total flux";

(3) If required, and as a substitute for the fluxes defined in paragraph (1) and (2) hereinabove, fluxes from the non-spectral radiation device; these fluxes will hereinafter be called "non-spectral fluxes"; they are used for illuminating the cells during the inoperative time periods so as to increase their stability, and also for checking the possibility of reproducing the response of the apparatus.

The spectroreceiver according to this invention comprises a number of devices called "intensity sources"; these are:

(1) Devices of known types which convert the fluxes (total flux and spectral fluxes, or non-spectral fluxes) into electrical energy. These devices called hereafter "photo-electric receivers" or "photo-cells" may consist for example of electron photo-multiplying cells. In the known manner, these devices may comprise separate sensitivity adjustment means.

(2) According to a specific embodiment of the invention, a device generating an electrical intensity which is constant with time. This device will be called hereafter a "constant-intensity source." When the photo-cells are electron photo-multiplying cells, the constant-intensity source may be obtained by causing the high-tension input of these cells to be fed through high-value resistors.

II. EVOLUTION UNITS (67)

These interchangeable parts are associated with the different sources of intensity, respectively. FIGURE 1 illustrates diagrammatically a typical example of an evolution unit. These members act differently according to the function inscribed at the control centre (programme of analysis).

(1) In the "integration" function and during the sparking period a direct feed voltage is applied to the tap 1; the relay 2 is in its energized condition; the first plate of the 10-microfarad capacitor 3 the second plate of which is grounded connected to the tap 4 fed from the output of the associated source of intensity is thus charged; the charging voltage appears on the tap 5.

(2) In the "Evolution" function of in the "Integration" function outside the sparking periods, the relay 2 is de-energized; the capictor 3 is short-circuited to the earth through a 1-kilo-ohm resistor 6. If the switch 7 is in its position 8 or "zero" position, the associated source of current is earthed; if it is in position 9 or "T" position, or position 10 (also called "X" position) the source of current feeds the impedance consisting of the 1-megohm resistor 14 and of the .5-microfarad capacitor 15 in parallel therewith, and the voltage across the terminals of this impedance will appear in the tap 12 or 13; moreover, in this case (position 9 or 10), the tell-tale light 11 is lighted.

III. INTEGRATION UNITS (68)

Figure 2:
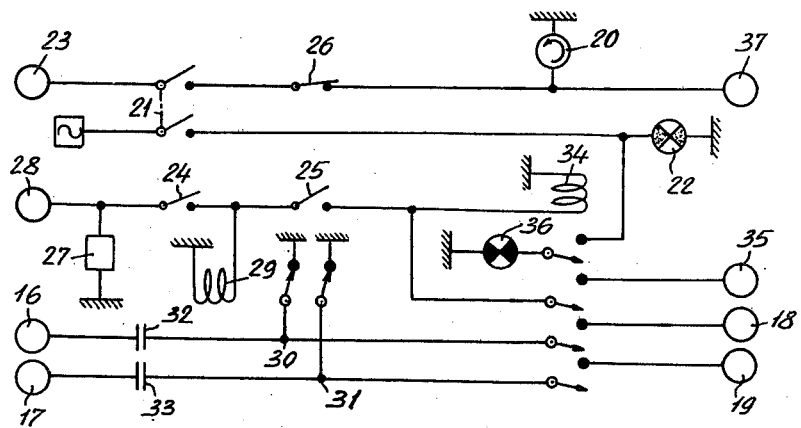
FIGURE 2 is a wiring diagram showing an "integration" unit.

Each of these intechangeable members is associated with a pair of evolution units. A typical form of embodiment of this arrangement is illustrated in diagrammatic form in FIG. 2.

The taps 16 and 17 of the integration unit are connected to the taps 5 of two evolution units and receive as an "integration" during the energization the charging voltages from these two units; these voltages are transmitted under certain conditions to the taps 18 and 19.

The integration unit, the automatic operation of which is obtained through a motor 20, operates only when the break switch 21 is closed as indicated by the tell-tale lamp 22 and when alternating voltage is fed to the tap 23, this occurring in the "Integration" function during the sparking period.

Under these conditions, the starting of the motor 20 occurs simultaneously with the energization of the sparking device. This motor drives a self-contained timing relay producing successive time periods, that is 0–T1, the firing time; T1–T2, integration time, and T2–T3, measurement time. The firing and integration times are preset and adjustable at will. The measurement time is not preset, it is of fixed value (for example two seconds).

The self-contained device in the form of the aforesaid timing relay comprises electric contacts 24, 25, 26. Taking the beginning of the sparking period as the time origin, the front contact 24 will close at moment T1; the front contact 25 on the other hand will close at time T2 and open at time T3; finally, the back contact 26 will open at time T3. Contacts 24 and 26 are restored to their normal or inoperative position at the end of the sparking period by a device 27 connected to the tap 28 and adapted to be fed with 24-volt direct current during the sparking period.

During the firing period (from 0 to T1) the relay 29 remains de-energized; thus, taps 30 and 31 are earthed; the first plates of the capacitors 32 and 33, which have a relatively low value (1000 picofarads) in comparison with capacitors 3, remain connected in parallel with these capacitors 3 of the two associated evolution units. The second plates of these capacitors are connected to the taps 30 and 31.

At the instant T1, the contact 24 being closed and relay 29 operative, taps 30 and 31 are disconnected from earth. During the integration period (from T1 to T2) capacitors 32 and 33 keep the charges received at the instant T1 and act as memory means, and the voltages at taps 30 and 31 represent the increase in the charging voltage of capacitors 3 associated from the moment T1 on.

During the measurement period (from T2 to T3) the transient closing of contact 25 controls the operation of relay 34. During this same period the increases in the charging voltage which correspond to the integration period are transmitted to the taps 18 and 19 and, on the other hand, a direct-current voltage is obtained at tap 35. This period is shown by the lighting of a tell-tale lamp 36.

At the moment T3 the contact 26 opens, the motor 20 is stopped and the alternating-current voltage disappears from the tap 37.

IV. CONTROL CENTER—AMPLIFIERS AND RECORDERS

Figure 3:
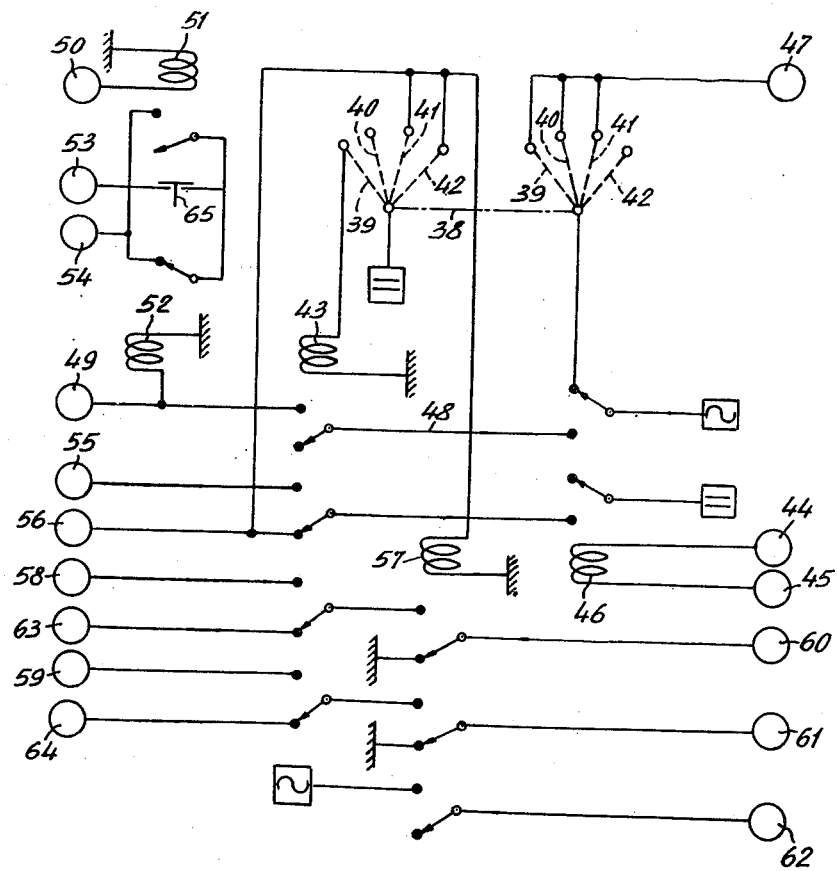
FIGURE 3 is another wiring diagram showing the control center.

A typical embodiment is exemplified in FIG. 3.

The control center is adapted, through a four-way switch to determine the function of the spectroreceiver.

1. "Integration" Function

The apparatus permits of measuring during a single sparking period the spectral fluxes of several lines.

The measurement of each spectral flux is effected at will as to either its inherent value (i.e. with respect to the source of constant intensity), or its relative value. In this latter case it is compared at will either with the spectral flux of a reference line, or with the total flux.

The spectral flux of each line is measured during the sparking period as the average (proper-value measure), or the ratio of the averages (relative-value measure) concerning one interval called the integration period, the limits of this period being selected at will for the lines considered.

This function is utilized for the current practice of analysis. It always consists in measuring the ratio of the integrated outputs of two sources of intensity; this measurement is effected on a plurality of pairs of sources of intensity during a single sparking period.

The position 39 of switch 38 defines the "integration" function.

The relay 43 fed with direct current voltage is in its energized condition.

Outside the sparking periods, the sparking source does not transmit any voltage to the taps 44 and 45. Relay 46 is de-energized. The non-spectral radiation device connected to the tap 47 is fed with an alternating voltage; the photo-electric cells are subjected to non-spectral radiation fluxes.

At the moment 0 where the sparking period begins, an alternating voltage appears across the terminals of the taps 44, 45. Relay 46 is energized. An alternating voltage is transmitted to connection 48; as the relay 43 is in operative position, this voltage is transmitted on the one hand to the tap 49 connected to taps 23 of the integration units, so as to cause the operation of all the integration untis contemplated in the programme, that is, those having their switches 21 closed, and on the other hand to the winding of relay 52.

If no integration unit is inscribed in the programme, no voltage will appear across the terminals of the tap 50 connected to taps 37 of all the integration units, and the relay 51 remains inoperative. Now, at the moment where the sparking begins the relay 52 is energized. As this relay is retarded (by a fraction of a second) the short-circuit of taps 53 and 54 is discontinued a short time after the beginning of the sparking period. Taps 53 and 54 are connected to a special circuit of the sparking source, so that the sparking proper is only possible when this circuit is closed. Consequently, if no integration unit is inscribed in the programme, the sparking will last only a fraction of a second.

If a plurality of integration units are contemplated in the programme, an alternating voltage from the taps 37 of these units will appear in the tap 50, and relay 51 will become energized when the sparking period begins. Consequently, the passage of the relay 52 to its energized condition, which occurs a fraction of a second after the beginning of the sparking period proper, will not involve a break in the sparking.

In this case, each integration unit will operate according to its inherent self-action and the alternating voltage in tap 37 will cease at T3.

On the other hand, the alternating voltage will cease in the tap 50 at the maximum instant T3 (the highest value in the aggregate durations T3 corresponding to all the integration units inscribed in the programme). Therefore, the sparking is discontinued when all the integration units inscribed in the programme have accomplished their cycle, including the measurement period.

When the sparking is interrupted, the alternating voltage from the sparking source which is fed to the taps 44, 45 ceases. The relay 46 resumes its de-energized condition and the alternating 115-volt current feed to tap 49 is discontinued so that all the integration units resume their inoperative condition.

During the sparking period, as the relay 46 is in its operative position a direct current voltage is transmitted to the tap 55 to feed the evolution units 67 (tap 1) and the integration units 68 (taps 28).

The tap 56 is connected to taps 35 of all the integration units. It receives a direct-current voltage during the measurement periods corresponding to the different integration units contemplated in the programme. During each of these periods the relay 57 is energized.

Taps 58 and 59 are connected to the taps 18 and 19, respectively, of all the integration units. Consequently, they receive during each measurement period the signals from an integration unit and therefore from two current sources.

Taps 60 and 61 are connected to the inputs of a pair of amplifiers of known type, respectively, which act as impedance converters. Outside the measurement periods, the inputs of the two amplifiers are earthed; during these measurement periods, signals are fed thereto.

A recording potentiometer of known type receives the output voltages from the aforesaid two amplifiers and indicates the measurement of their ratio. The tape-driving motor of this recording apparatus is fed through the tap 62 which, due to the operation of the relay 57, receives an alternating voltage only during the measurement periods. As a consequence, the paper tape is paid out only during the measurement periods.

2. *"Evolution—Spectral Radiation"* Function

The evolution of a line, or of the spectral flux ratio of two lines, or the evolution of the ratio of the spectral flux of a line to the total flux, is studied during the sparking period. This function is useful to determine the conditions of operation of the integration programme through the rational investigation for determining the best conditions of sparkling and timing of the integration.

The position 40 of switch 38 determints the "Evolution—Spectral Radiation" function.

The relay 43 is de-energized.

The non-spectral radiation device connected at 47 is controlled as in the integration through a set of relays 46; this device is fed with voltage only outside the sparking periods.

By means of the same set of relays a direct voltage is fed to the relay 57 during the entire sparking period. The measurement period (paying out of the paper tape of the recording apparatus, and transmission of the signals to the amplifiers) is identified with the sparking period. The signals from taps 63 and 64 connected to taps 12 and 13 of all the evolution units 67, respectively, are proportional to the outputs of the two sources of intensity selected according to the evolution programme.

The sparking break is not determined by the set of relays 51, 52 which remain inoperative or de-energized, but through the manual opening of the circuit of taps 53, 54 by means of a push-button 65.

3. *"Evolution—Non-Spectral Radiation"* Function and *"Non-Radiation"* Function

With these two functions it is possible to check the response of the photo-electric cells either subjected to the non-spectral (constant) fluxes, or in the non-illuminated (dark) state. They differ from each other only in that the non-spectral radiation device is operative or inoperative.

These two functions are defined by the positions 41 and 42, respectively, of switch 38. In both cases, relay 43 is de-energized and relay 57 energized.

Consequently, the measurement takes place continuously and the signals emitted from the taps 63, 64 connected to taps 12 and 13 respectively of all the evolution units are proportional to the outputs of the two sources of intensity selected in the evolution programme.

FIGURE 4 shows a wiring diagram illustrating the manner in which the different sections of the assembly are interconnected. Thus, this assembly comprises:

The intensity sources 66 (three of which are illustrated);

The evolution units 67 (three of which are illustrated);

The integration units 68 (two of which are illustrated);

The control center 69;

The sparking source 70;

The non-spectral radiation device 71;

The T-channel amplifier 72;

The X-channel amplifier 73;

The recorder 74;

The intensity source outputs 75;

Outputs 76 and 77 of a voltage corresponding to the sparking period;

The outputs 78 and 79 of a circuit the closing of which permits the occurrence of the sparking;

The input of the non-spectral radiation device 80;

The signal input of amplifier T at 81;

The signal output of amplifier T at 82;

The signal input of amplifier X at 83;

The inputs 85 and 86 of the two signals in the recorder;

The feed 87 for the recorder paper-tape driving motor.

FIGURE 5 is a diagrammatic view of the front panel of an apparatus constructed in accordance with the teachings of this invention. It will be seen that the evolution units 67 are disposed in a row and connected by means of detachable cord connectors with jacks, plugs or the like to the integration units 68 forming two other rows disposed above and below the evolution units row, respectively. This disposition is sound in that it permits for example of grouping on the one hand the couplings designed for the proportioning of elements, which remain permanently in the apparatus, and on the other hand the couplings intended for an occasional search which are adapted to be altered or modified at will.

A last row comprises in alignment the amplifiers 72 and 73, the control center 69 and an input section 80.

It may be emphasized that in the above description the so-called "direct-current" feed voltages may consist of a 24-volt current, whereas the so-called "alternating-current" feed voltages may consist of a 115 or 220-volt, 50-cycle current.

Of course, the numerical data concerning the voltage, resistance, capacity, time and current characteristics (A.-C. or D.-C. current) are given by way of example only.

The operation and the advantages of the apparatus will be better understood from the following remarks:

The "Evolution" function programme consists in selecting the two detectors comprising two photocells to be used. This programme is preset by means of the series of switches 7 of the evolution units. It is indicated at any moment through the tell-tale lamps 11 of these units.

It is constantly possible to register a programme and to signal the registered programme; these possibilities exist even during the use of the spectroreceiver in the integration function. It is thus possible to prepare an evolution programme during the integration operations.

To register an evolution programme, switch 7 associated with the source of intensity to be studied is set on position X, and switch 7 associated with the reference source of intensity is set on position T; all the other switches 7 are set in their "zero" position. Then, only the tell-tale lamps 11 corresponding to the two selected sources of intensity are lighted.

In the "Evolution and Non-Radiation" function it is preferable to take as a reference only the constant intensity source, and the dark current of a photo-electric cell will be recorded.

In the "Evolution and Non-Spectral Radiation" function, the ratio of the outputs of two photo-electric cells illuminated by the non-spectral radiation device, will be recorded; or, taking the constant-intensity source as a reference, the output of a single photo-electric cell illuminated by the non-spectral radiation device will be recorded. Thus, it will be possible to check the response or fidelity of the photo-electric cells as far as their sensitivity is concerned.

In the "Evolution and Spectral Radiation" function, the source of constant intensity may be taken as reference, and the evolution of the spectral flux of a line will be recorded. This method may be restorted to for researches of a certain character and for determining the conditions of timing required for measuring the proper value of the spectral flux of the line concerned in the integration function. It may also be currently used for adjusting the position of the output slits in view of compensating the spectrum displacements, this type of adjustment being usually called "shaping." Furthermore, also in the "Evolution and Spectral Radiation" function, it will be possible to record either the evolution of the ratio of the spectral fluxes of two lines, or the evolution of the spectral flux ratio of a line to the total flux. This method will be used preferably for certain research work and for finding the best timing conditions to be used for measuring the relative value of the spectral flux of a line in the integration function.

In case the output slits were mounted on several blocks to be adjusted independently in position, this last-mentioned method may also be used for the "shaping" operation by determining the ratio of the intensity of one line of a block being moved to the intensity of a line in a block which is held stationary, this procedure offering the advantage of reducing the fluctuations likely to be detrimental for the recording.

The integration function programme consists in selecting the pairs of intensity sources to be examined during a sparking period. This programme is registered or preset by means of the set of switches 21 of the integration units. It is indicated permanently through the illuminated tell-tale lamps 22 of these units.

The timing of an integration programme consists in properly adjusting the durations of the striking and integration according to the integration units registered in the programme. The only requirement in this respect is to avoid that the measurement periods overlap one another.

The possibility of registering and timing a programme and the indication of this programme are permanent; they remain valid even during the use of the spectroreceiver in the evolution function. Thus, it is possible to prepare an integration programme during the evolution operation.

It is not necessary to cancel the evolution programme for operating in the integration function, and vice-versa, it is not necessary to cancel the integration programme for operating in the evolution function. To switch from one function to another, it is sufficient to operate a single switch 38 in the control center.

In the "Evolution" function any possible couplings in the aggregate sources of intensity are feasible. In an assembly of N sources of intensity, there may be ½ N (N−1) separate couplings. All these couplings may be carried out by simply registering them in the evolution programme.

In the "Integration" function, the same evolution units may be connected to a plurality of integration units, and all possible and desired couplings may be effected as well. When a source of intensity shares in several couplings, its output becomes the object of a plurality of integration measurements effected with different timings; the timings concerning the different couplings are therefore selected independently, provided only that the short measurement periods do not overlap one another. To sum up, any possible couplings may be contemplated and their timings may be selected separately. All the couplings provided, that is, the couplings corresponding to preset integration units, may be carried out by simply registering them in the integration programme. Exceptional programmes can be effected by simple providing the adequate connections between the inputs 16 and 17 of additional integration units.

When operating in the integration function, the measurement of the spectral flux of each line may be effected in view of finding its proper value, or the value compared with the total flux, or compared with the spectral flux of a reference line. In this last case the lines examined in a same integration programme may be compared with different reference lines. These three forms of measurement may coexist in a same integration programme.

When the measurements are effected with respect to a reference line (according to the so-called "internal standard" method) it is as easy to change the choice of a reference line as to change the choice of a line to be examined; it is sufficient to cancel from the programme one integration unit and to register another unit in lieu thereof. Therefore, the spectroreceiver is perfectly suitable for examining in a same equipment different substances which differ from one another through their basic element; for example, in the spectral analysis by emission of ferrous alloys, light alloys, etc. in the same apparatus.

The timing adjustment of the integration units is not critical. A difference in the preset value of T1 or T2, as may occur between two successive adjustments, will not impair the results, for what is measured is the quotient of the integrals of two varying magnitudes, which integrals are both taken between the same limits of time.

The measurements are not carried out subsequently to, but during the sparking period. The duration of the sparking time is sufficient to enable all the measurements required by the programme to take place.

The operation of the spectroreceiver is not subordinate to a limited number of strictly-defined programmes but on the contrary this operation is extremely versatile and affords very wide possibilities within the frame of an extension of the number of evolution units and integration units.

The invention comprises the adaptation of the above-described device to any combination or assembly of devices acting like the sources of intensities defined hereinabove, that is, delivering simultaneously electric currents under the influence of excitations having a common origin. Thus, the invention comprises the adaptation of the aforesaid device to the measurements of strains at different points of a mechanical system subjected to forces of external origin; in this case the spectral fluxes are replaced by the strains acting at these different points, extensometers or strain-gauges being substituted for the photo-electric cells. The device according to this invention and described hereinabove as a spectroreceiver may be termed "multireceiver" in view of its more general application.

From the foregoing it is apparent that the apparatus described herein is adaptable to any system in which different parameters having a varying character are to be measured; during this evolution, it carries out, according to a programme defined beforehand at will, a complete series of measurements, some of which relate to the average values of different parameters in time intervals selected independently, the others concerning the ratios of the average values of different parameters in time intervals selected independently; moreover, with this apparatus one of the parameters or the ratio of two parameters may be recorded as a function of time.

It is to be understood that the above description concerning a specific embodiment of the invention is given by way of example only, and that many modifications and alterations may be made thereto without departing from the spirit and scope of the invention as set forth in the appended claims.

I claim:

1. In a spectro-chemical analysis system having a sparking source for exciting emission from a sample, and a light-dispersing system, an apparatus for direct analysis of emission spectra, applicable in particular to the rapid and simultaneous evaluation of a plurality of chemical elements during the same sparking period, said apparatus comprising: a plurality of sources of current, of which one is a source of constant intensity, the other said sources being each constituted by a photo-electric cell intended to be excited by emission radiation of definite wavelength; a plurality of evolution units, each comprising a condenser charged by the associated current source during the sparking period of integration measurement, an impedance receiving said current during the period of instantaneous measurement and outside the integration measurement period, relay means for connecting the current from said source either to said condenser or to said impedance at will, and a switch for short-circuiting said impedance; a plurality of integration units each associated with a pair of said working units and intended to receive the charging-voltages from said evolution units, said integration units each comprising an independent timing device; further condensers intended to be connected in parallel to said first-mentioned condensers; relay means for transmitting the increases in charging voltage received by said second condensers during the integration period, and switches for putting said integration units into or out of circuit; a control centre permitting the measurement of the current generated by each ray with respect to the current from said constant intensity source, and with respect to a reference flux and to a total flux of undispersed light, said control centre comprising relay means for applying an alternating voltage to one terminal coupled to all said integration units, a further terminal being energized when at least one of said integration units has been put into circuit, said second terminal supplying further relay means for actuating a switch disposed on a sparking circuit, whereby the sparking is cut-off as soon as all said integration units have completed their cycle, said first relay means when excited applying a direct-current potential to said evolution units and said integration units, said control center being further coupled to amplifiers to a potentiometer giving the ratio of the output voltages of said amplifiers, input terminals of said control center being coupled to all said evolution units in such manner that said input terminals receive signals from one working unit or a pair of working units for an instantaneous measurement; and a switch for selecting instantaneous or integration measurement.

2. Apparatus as claimed in claim 1, in which said source of constant intensity is formed by supplying a stabilized voltage to a stable resistance of high value, said resistance supplying a reference for measuring the real values of the integrated intensities of the spectral rays, and also a reference for recording the values of the instantaneous intensities of said spectral rays.

3. Apparatus as claimed in claim 1, in which each said evolution unit comprises a relay which, depending on the integration of working function entered in said program center, enables the signal to be directed either to an integration condenser or to a time-constant impedance, said integration condenser being then short-circuited by a resistance of low value.

4. Apparatus as claimed in claim 1, in which each said evolution unit comprises a three-position switch by which the signal from said source of intensity: is short-circuited to earth in the instantaneous measurement position; is directed to one or the other of the signal output terminals, whereby the instantaneous measurement program is entered by means of said switches.

5. Apparatus as claimed in claim 1, in which said integration units are each coupled to two evolution units by removable electric couplings, thereby enabling two of said intensity sources to be selected for measurement of the ratio of their intensities, said intensities being then integrated during the same period of time.

6. Apparatus as claimed in claim 1, in which each said integration unit comprises a motor-driven independent timing device, the cycle of which is started from a terminal of said unit by the control center of said apparatus; three electric contacts on said timing device, one of said contacts closing at the end of the striking period to permit the operation of a relay which disconnects a charge-transmission condenser from earth; closure of the second said contact corresponding to the beginning of the measurement period, and its opening to the end of said period, said second contact enabling a further relay to be energized so as to transmit the variations in charge of said integration condensers through said transmission condensers; said third contact opening at the end of the measurement period to stop the motor driving said timing device and to remove the voltage on one terminal connected to said control center.

7. Apparatus as claimed in claim 1, in which each said integration unit comprises two storage condensers connected to the integration condensers of the associated evolution units, whereby the charges of said integration condensers acquired during the striking period may be stored in order to measure the increase in charge of said integration condensers during the integration period only.

8. Apparatus as claimed in claim 7, in which one plate of each said storage condenser is constantly connected to the non-earthed plate of the associated integration condenser, the other plate being isolated from earth by a relay at the moment of initiation of the integration period.

9. Apparatus as claimed in claim 7, in which the recording device comprises a paper-unwinding device, and in which each said integration unit comprises a second relay controlling said independent timing device and which, for a short period following the end of the integration period, connects the isolated plate of said storage condenser to two signal output terminals, thereby transmitting a control voltage which actuates the paper-unwinding device of said recorder.

References Cited in the file of this patent

UNITED STATES PATENTS

| | | |
|---|---|---|
| 2,436,104 | Fisher et al. | Feb. 17, 1948 |
| 2,480,636 | Dieke | Aug. 30, 1949 |
| 2,572,119 | Dieke | Oct. 23, 1951 |
| 2,577,815 | Saunderson et al. | Dec. 11, 1951 |
| 2,675,734 | Hasler et al. | Apr. 20, 1954 |
| 2,734,418 | Enns | Feb. 14, 1956 |
| 2,735,330 | Polster | Feb. 21, 1956 |
| 2,744,438 | Steinhaus et al. | May 8, 1956 |